United States Patent
Horst et al.

(10) Patent No.: US 9,527,231 B2
(45) Date of Patent: Dec. 27, 2016

(54) WIRE BUNDLE OVERMOLD STRUCTURE

(71) Applicant: Continental Automotive Systems, Inc., Auburn Hills, MI (US)

(72) Inventors: John Bruce Horst, Sterling Heights, MI (US); Ken Garrigues, Orion Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 483 days.

(21) Appl. No.: 14/260,880

(22) Filed: Apr. 24, 2014

(65) Prior Publication Data
US 2015/0306800 A1    Oct. 29, 2015

(51) Int. Cl.
| | |
|---|---|
| *H01B 7/00* | (2006.01) |
| *H02G 3/04* | (2006.01) |
| *B29C 45/14* | (2006.01) |
| *B29K 21/00* | (2006.01) |
| *B29L 31/34* | (2006.01) |

(52) U.S. Cl.
CPC ... *B29C 45/14549* (2013.01); *B29C 45/14065* (2013.01); *B29C 2045/14139* (2013.01); *B29K 2021/006* (2013.01); *B29L 2031/3462* (2013.01)

(58) Field of Classification Search
CPC ............. B29C 45/14549; B29C 45/14065; B29C 2045/14139; B29K 2021/006; B29L 2031/3462

USPC .............................. 174/68.3, 72 A
See application file for complete search history.

(56) References Cited

U.S. PATENT DOCUMENTS

| | | | | |
|---|---|---|---|---|
| 4,719,321 A | * | 1/1988 | Kozel | G02B 6/3887 174/135 |
| 5,832,960 A | * | 11/1998 | Amatsutsu | H02G 3/0487 138/110 |
| 2004/0154817 A1 | * | 8/2004 | Sudo | H02G 3/06 174/481 |
| 2006/0027387 A1 | * | 2/2006 | Goto | H02G 15/013 174/651 |
| 2013/0000974 A1 | * | 1/2013 | Igarashi | B60R 16/0215 174/70 R |
| 2014/0027147 A1 | * | 1/2014 | Yamamoto | H02G 3/0462 174/68.3 |

* cited by examiner

*Primary Examiner* — Sherman Ng

(57) ABSTRACT

A method joins wire assemblies to define a wire harness by providing a mold assembly having a plurality of surface features therein to define an overmold structure. A portion of at least two individual and unconnected wire assemblies is placed into the mold assembly. The mold assembly is closed. During a molding process, uncured material is injected into the mold. The material is permitted to cure to define the overmold structure fixed to and joining the at least two wire assemblies. The portions of the wire assemblies are removed from the mold with the overmold structure thereon to define a wire harness, with opposing ends of the wire assemblies being free from covering by the overmold structure.

11 Claims, 2 Drawing Sheets

WIRE BUNDLE OVERMOLD STRUCTURE

FIELD

This invention relates to wire assemblies and, more particularly, to combining multiple wire assemblies into a single wire harness using overmolding technology.

BACKGROUND

In automotive applications, multiple wire assemblies are employed. It is preferable to join a plurality of wire assemblies into a single wire harness if they are to be connected at common locations. Typically, wire assemblies are bundled into a single extrusion by the wire maker. However, due to this single extrusion, long segments of the wire assembly need to be exposed for use. The only way to expose these wire assemblies is to strip the outer casing or jacket. In some instances, the stripping distance is so long that stripping is no longer a solution since there is too much friction holding the main jacket onto the wire assembly.

Thus, there is a need to provide a wire bundle overmold structure that combines multiple wire assemblies into a single wire harness or structure without the need for the conventional stripping operation.

SUMMARY

An object of the invention is to fulfill the need referred to above. In accordance with the principles of the present invention, this objective is achieved by a method of joining wire assemblies to define a wire harness. The method provides a mold assembly having a plurality of surface features therein to define an overmold structure. A portion of at least two individual and unconnected wire assemblies is placed into the mold assembly and the mold assembly is closed. During a molding process, uncured material is injected into the mold. The material is permitted to cure to define the overmold structure fixed to and joining the at least two wire assemblies. The portions of the wire assemblies are removed from the mold with the overmold structure thereon to define a wire harness, with opposing ends of the wire assemblies being free from covering by the overmold structure.

In accordance with another aspect of an embodiment, a wire harness includes at least two individual and unconnected wire assemblies and an overmold structure fixed to and joining the at least two wire assemblies, with opposing ends of the wire assemblies being free from covering by the overmold structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
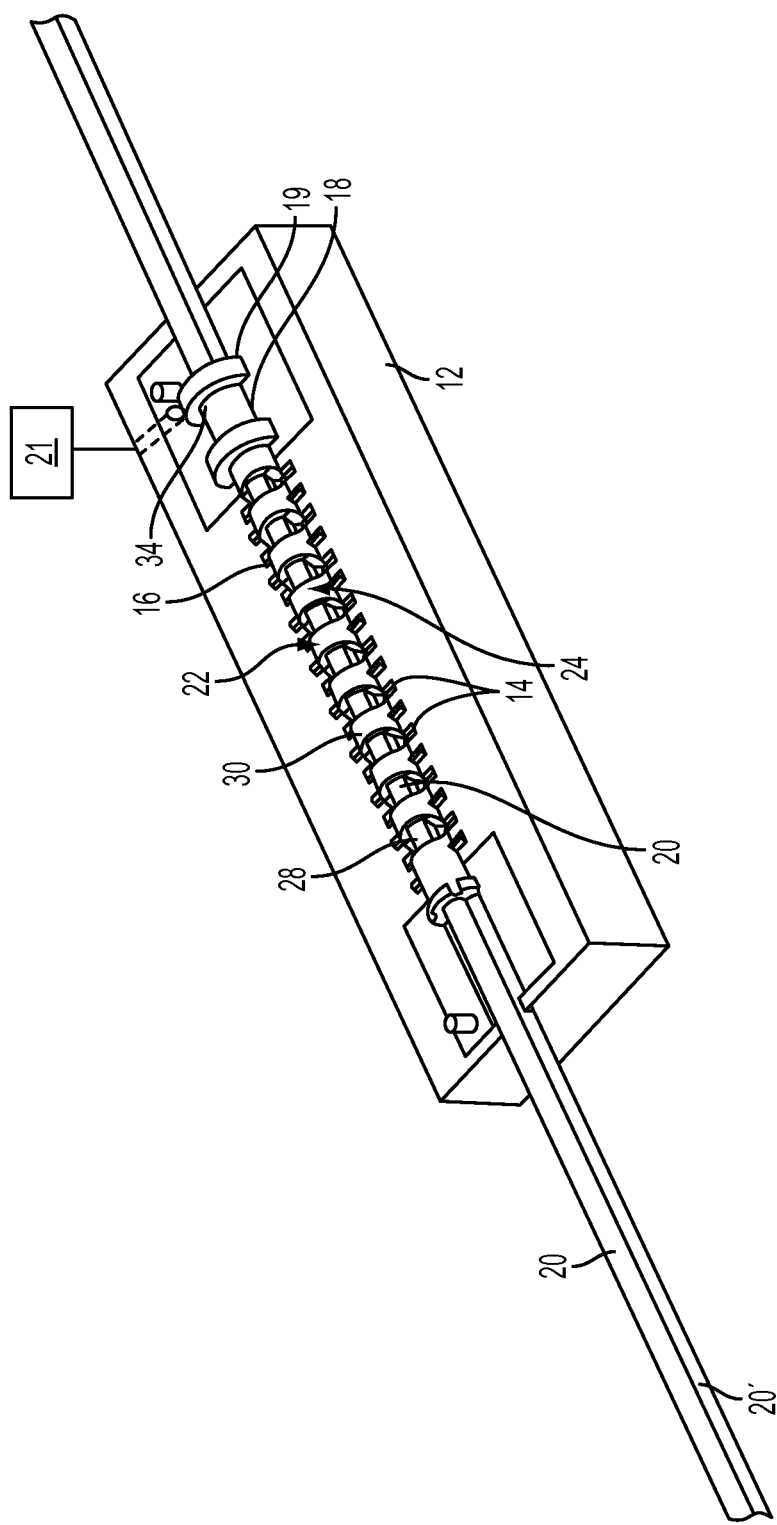
FIG. 1 is a view of a bottom mold of a mold assembly for providing an overmold structure on multiple wire assemblies in accordance with an embodiment.

With reference to FIG. 1, a mold assembly, generally indicated at 10, is shown in accordance with an embodiment. The mold assembly includes a bottom mold 12 having a variety of mold surface features 14, 16, 18, etc. The mold assembly 12 also includes a top mold (not shown) that has mold surface features that are a mirror image of surface features 14, 16, 18, 19, etc. so that the surface features of the top and bottom molds define an overmold structure.

A portion of at least two or a plurality of wire assemblies 20, 20' and 20" (see FIG. 2) is placed in the mold assembly 12. The wire assemblies 20, 20' and 20" are individual, unconnected and insulated electrical wires. The top mold is then secured to the bottom mold 12 to close the mold assembly 12 and an uncured molding material 21 is injected into the mold assembly 10. The molding material 22 is preferably a low durometer rubber or thermoplastic elastomer (TPE) such as, for example, Santoprene®. The material 21 is permitted to cure and the molding process defines a wire bundle overmold structure, generally indicated at 24, that is fixed to the wire assemblies 20, 20' and 20" and which joins the portions of the wire assemblies into a single unit. FIG. 1 shows the overmold structure 24 once molding is complete and the top mold is removed from the bottom mold 12.

Figure 2:
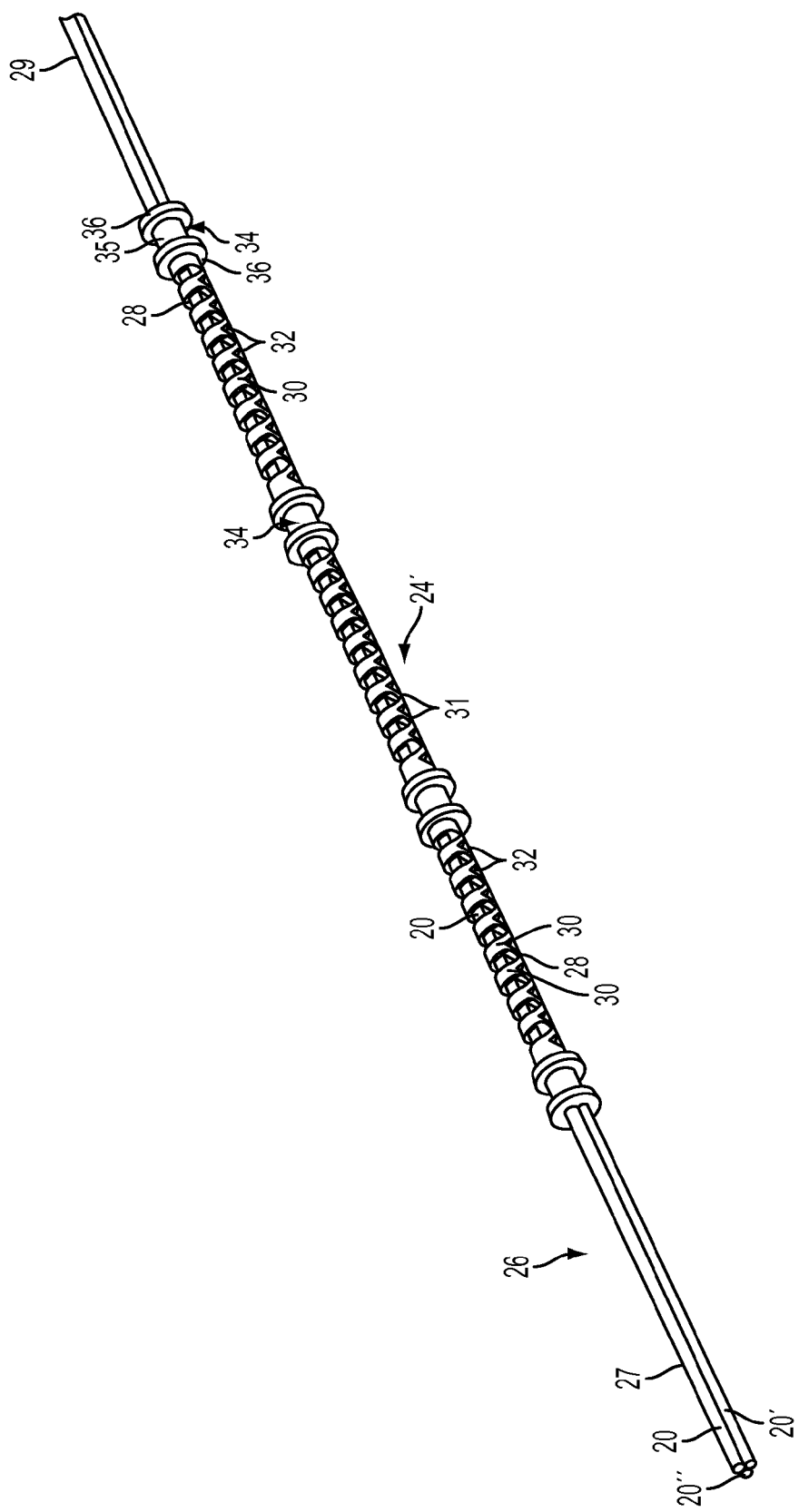
FIG. 2 is a view of a wire harness having an overmold structure on multiple wire assemblies upon completion of molding.

FIG. 2 shows a wire bundle overmold structure 24' (using a different mold than that shown in FIG. 1) so as to cover a greater length of the wire assemblies 20, 20' and 20". Thus, it can be appreciated that the mold assembly 12 can be configured to provide the desired length of the wire bundle overmold structure 24, 24' to define a wire harness, generally indicated at 26. The overmold structure 24 or 24' is an elongated, generally cylindrical structure provided over a generally central portion of the wire assemblies 20, 20', 20" so that opposing ends 27 and 29 of the wire assemblies remain uncovered by the overmold structure 24'. Thus, unlike conventional wire harnesses, no stripping of the overmold structure 24' is required to access the wire assemblies 20, 20', 20".

As best shown in FIG. 2, surface features of the mold assembly 12 define a plurality of recesses 28 in the overmold structure 24', with each recess 28 being disposed between a pair of generally annular overmold members 30. The overmold members 30 are connected with each other at connection portions 31. The recesses 28 can expose a portion of the wire assembly or may include a layer of material, which is thinner than the overmold members 30, over a portion of the wire assembly therebelow. Recesses 28 are shown in FIG. 2 at a top side of the overmold structure 24', but due to the symmetric mold assembly 12, similar recesses 28 are provided at the opposing bottom side (not shown) of the overmold structure 24'. The recesses 28 allow for greater flexibility of the wire bundle overmold structure 24' while the wire assemblies are held in a single bundle for ease of routing. A cutout 32, formed by mold feature 14, is provided in each overmold member 30 generally adjacent to the connection portion 31 for additional flexibility of the overmold structure 24'.

The overmold structure 24' includes grommet members, generally indicated at 34, formed by mold features 18 and 19. Each grommet member 35 includes a generally cylindrical body 35 allowing the user to attach clips (not shown) thereto in a secure fashion to the overmold structure 24' and thus the harness 26. Opposing ends 36 of each grommet member 34 has a diameter greater than the diameter of the body 35 to prevent the clips from sliding lengthwise of the harness 26 and thus ensures that the clips hold the harness 26 in position when mounted.

Thus, the wire bundle overmold structure 24' provides a single wire harness 26 and eliminates the need for a wire stripping operation. In addition, each wire assembly 20, 20', 20" can be easily molded and created prior to the final bundling with the overmold structure 24'. This eases the manufacturing process into smaller, more manageable steps. Due to the overmold structure 24', the wire assemblies 20, 20', 20" will not rub against each other since they are held securely together. The use of the overmold structure 24' allows the flexibility of custom thickness, lengths, recesses 28, and grommet member configurations to meet customer needs. The overmold structure 24' also ensures containment, protection and routing of wire assemblies in a single bundle solution.

The wire harness 26 with overmold structure 24' can be used in automotive applications such as for brakes, wheel speed sensor, electronic park brake wire assemblies, sensor harness, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of joining wire assemblies to define a wire harness comprising the steps of: providing a mold assembly having a plurality of surface features therein to define an overmold structure, placing a portion of at least two individual and unconnected wire assemblies into the mold assembly, closing the mold assembly, during a molding process, injecting uncured material into the mold, permitting the material to cure to define the overmold structure fixed to and joining the at least two wire assemblies, and removing the portions of the wire assemblies from the mold with the overmold structure thereon to define a wire harness, with opposing ends of the wire assemblies being free from covering by the overmold structure, wherein the overmold structure includes a plurality of recesses therein, each recess being disposed between a pair of generally annular overmold members, wherein the overmold members are connected with each other at a connection portion, and wherein each overmold member includes a cutout generally adjacent to the connection portion.

2. The method of claim 1, wherein the overmold structure has opposing sides, the recesses being in each of the opposing sides.

3. The method of claim 1, wherein the recesses are molded so as to expose at least a portion of one of the wire assemblies.

4. The method of claim 1, wherein the overmold structure includes at least one grommet member including a generally cylindrical body and opposing ends, each end having a diameter greater than a diameter of the body.

5. The method of claim 1, wherein the material is rubber or thermoplastic elastomer.

6. A wire harness comprising: at least two individual and unconnected wire assemblies, an overmold structure fixed to and joining the at least two wire assemblies, with opposing ends of the wire assemblies being free from covering by the overmold structure, wherein the overmold structure includes a plurality of recesses, each recess being disposed between a pair of generally annular overmold members, wherein the overmold members are connected with each other at a connection portion, and wherein each overmold member includes a cutout generally adjacent to the connection portion.

7. The wire harness of claim 6, wherein the overmold structure has opposing sides, the recesses being in each of the opposing sides.

8. The wire harness of claim 6, wherein the recesses expose at least a portion of one of the wire assemblies.

9. The wire harness of claim 6, wherein the overmold structure includes at least one grommet member including a generally cylindrical body and opposing ends, each end having a diameter greater than a diameter of the body.

10. The wire harness of claim 6, wherein the material is rubber or thermoplastic elastomer.

11. The wire harness of claim 6, wherein the overmold structure is elongated and generally cylindrical.

* * * * *